July 26, 1966     J. SCHRÖDER     3,263,113
TUNGSTEN FILAMENT LAMP COMPRISING HEXAFLUORIDE GAS AT
PARTIAL PRESSURE NOT EXCEEDING 10 TORRS
Filed July 2, 1962
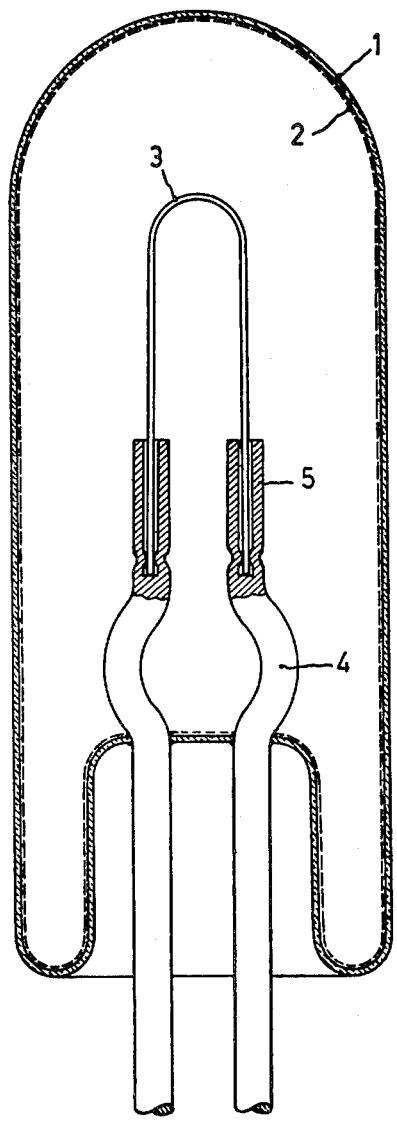
INVENTOR
JOHANN SCHRÖDER
BY
AGENT

3,263,113
TUNGSTEN FILAMENT LAMP COMPRISING HEXAFLUORIDE GAS AT PARTIAL PRESSURE NOT EXCEEDING 10 TORRS
Johann Schröder, Aachen, Germany, assignor to North American Philips Company, Inc., New York, N.Y., a corporation of Delaware
Filed July 2, 1962, Ser. No. 206,865
Claims priority, application Germany, July 26, 1961, N 20,382
5 Claims. (Cl. 313—223)

This invention relates to gas-filled incandescent lamps having a tungsten incandescent body and filled with a gas consisting wholly or in part of tungsten hexafluoride.

The life of such a lamp depends upon the rate of evaporation of the tungsten and hence upon the burning temperature. The light output increases according as the burning temperature is higher. In order to obtain a long lifetime of the incandescent body at the maximum burning temperature and hence at the maximum light output, the rate of evaporation at a given temperature has to be reduced by suitable steps. Many non-reactive filling gases are already known which are capable of suppressing the evaporation of tungsten. Experience has shown that non-reactive gases of a maximum molecular weight are most suitable for this purpose. However, usable gases in this connection are mainly nitrogen and argon, the heavier and much more expensive rare gases being used only for costly special lamps.

It has also been suggested to use such substances as filling gases or additions to non-reactive gas fillings as are non-reactive with respect to the incandescent body. For this purpose, for example iodine and tungsten iodide have been suggested. The action of these substances must be such that the tungsten iodide added or formed in the lamp due to thermal reaction causes tungsten to be separated from the incandescent body after thermal dissociation. However, the said compound has a serious limitation in that it is not particularly thermally stable. Consequently, the tungsten is separated not only on the hottest parts of the incandescent body where the tungsten evaporates at the highest rate, but also at comparatively cold areas. The tungsten is thus separated irregularly. Moreover, iodine is not capable of reacting with the evaporated tungsten deposited on the comparatively cold bulb wall, in order thus to maintain a cyclic process compensating for the evaporation of the tungsten and suppressing blackening of the lamp. The same holds good for bromine and chlorine compounds.

It has been found, however, that small quantities of tungsten hexafluoride as a reactive transporting gas in such a cyclic process can permanently suppress evaporation of the incandescent body and blackening of the bulb.

It is true that tungsten hexafluoride has previously been suggested as a non-reactive filling gas for incandescent lamps. According to this suggestion, the lamp must be filled either with pure tungsten hexafluoride at a pressure of 1 atm. or with a mixture of conventional non-reactive gases and tungsten hexafluoride, the hexafluoride, requiring a partial pressure of at least 10 Torr. However, from a technical point of view, this suggestion was impracticable since tungsten hexafluoride reacts intensely with the incandescent body at the recommended pressure immediately after the lamp had been switched on. Beside, $WF_6$ and especially the fluorine formed upon dissociation of the $WF_6$ on the hot incandescent body chemically attack the comparatively cold parts of the lamp.

Consequently, tungsten hexafluoride had been found to be reactive and not usable as such under the conditions prevailing in incandescent lamps.

Extensive experiments have shown, however, that tungsten hexafluoride is serviceable as a reactive transporting gas in very small quantities.

Tungsten hexafluoride has a considerably greater stability than all the substances suggested hitherto for transport of tungsten to the incandescent body. Consequently, tungsten is deposited only on the hot parts of the incandescent body where the vapor pressure of the tungsten is also a maximum. The fluorine obtained by the dissociation of the $WF_6$ reacts already in the cold state with tungsten to form hexafluoride, so that evaporated tungsten in the cycle is constantly retransported through $WF_6$ to the hot incandescent body. $WF_6$ has the further advantage that, unlike transporting gases which are thermally not particularly stable, tungsten is not separated irregularly as crystals on the incandescent body. As soon as a crystal grows out of the surface of the incandescent body, this area becomes colder since it is traversed by a smaller current and radiates more energy as a result of a larger surface. However, the dissociation of the $WF_6$ and consequently the separation of tungsten declines at these comparatively cold areas and tungsten is deposited again due to the inverse reaction $3F_2 + W \rightarrow WF_6$. Consequently, as experiments have shown, tungsten will always grow only on the thinner hot parts of the incandescent body, resulting in a regular, circular geometry of the incandescent body being stabilised.

Since fluorine reacts with tungsten already in the cold state, the comparatively cold ends of the incandescent body are rapidly attacked by the fluorine obtained upon dissociation while forming $WF_6$. This undesirable attack occurs in particular at areas having temperatures below 2000° C. Consequently, the ends of the incandescent body must be protected from attack by fluorine by means of an envelope resistant to fluorine. This may be achieved by passing, for example, the comparatively cold ends of the tungsten wire through a tube surrounding the wire as intimately as possible without having direct electric or thermal contact with it. Such a tube may consist, for example, of a fluoride or a metal resistant to fluorine.

All the remaining metal parts may advantageously be made from metals which are either resistant to chemical attack by fluorine and tungsten hexafluoride or coated with a thin layer of metal fluoride preventing further attack, for example, a layer of copper, nickel, aluminum or magnesium. In particular, nickel is preferred since it is fluorine-resistant even at temperatures up to 700° C.

Dry fluorine or dry fluorine compounds do not attack glass and quartz at room temperature. At elevated temperature, however, it is desirable for all the parts of the lamp, except the hot incandescent body, to be coated with a fluorine-resistant layer, for example a thin protective layer of $CaF_2$ or $MgF_2$.

Preferably, the pressure or partial pressure of the tungsten hexafluoride should have a value below 10 Torrs, as indicated in Table I.

*Table I*

Lifetime of lamps having tungsten incandescent bodies.
Burning voltage: 15 volts. Burning temperature: 3,000° C.

| Gas filling | Pressure or partial pressure of the $WF_6$ | Lifetime (deterioration of the incandescent body) |
|---|---|---|
| $WF_6$ | 1 atm | A few seconds. |
| Ar+$WF_6$ [1] | 10 Torrs | 2 hours. |
| $WF_6$ | 10 Torrs | 30 minutes. |
| $WF_6$ | 5 Torrs | 20 hours. |
| $WF_6$ | 1 Torr | 43 hours. |
| Ar+$WF_6$ [1] | 1 Torr | 71 hours. |
| Ar+$WF_6$ [1] | 0.5 Torr | 96 hours. |

[1] Partial pressure of the Ar 700 Torrs.

The lamp may be filled either with pure tungsten hexafluoride or with a mixture of $WF_6$ and a non-reactive gas such as nitrogen, argon or the like.

It will be evident that, instead of $WF_6$, fluorine or fluorine compounds such as, for example $NF_3$, can primarily be introduced into the lamp, which compounds then react with the incandescent body to form $WF_6$ and non-reactive dissociation products, such as, for example, nitrogen.

The accompanying drawing shows an embodiment of an incandescent lamp in section in accordance with the invention. The glass bulb 1 is coated with a layer of $MgF_2$. The incandescent body 3 is of tungsten and the gas filling consists of tungsten hexafluoride and a non-reactive gas. The supporting and current-supply wires 4 for the incandescent body 3 are made of nickel. The ends of the incandescent body 3 are inserted into cavities 5 drilled in the current-supply wires 4.

What is claimed is:

1. An incandescent lamp comprising a bulb having a gas filling consisting essentially of tungsten hexafluoride at a partial pressure not exceeding 10 Torrs, a tungsten filament having a portion which incandesces when an electric current flows therethrough and a portion which is at a lower temperature than the temperature of the incandescent portion, a fluorine-resistant coating on said latter portion of said filament, and a fluorine-resistant coating on the inner wall of said bulb.

2. An incandescent lamp comprising a bulb having a gas filling consisting essentially of tungsten hexafluoride at a partial pressure not exceeding 10 Torrs, a tungsten filament having a portion which incandesces when an electric current flows therethrough and a portion which is at a lower temperature than the temperature of the incandescent portion, and a fluorine-resistant coating on said latter portion of said filament.

3. An incandescent lamp comprising a bulb having a gas filling consisting essentially of a gaseous fluorine-containing substance at a partial pressure not exceeding 10 Torrs and which is decomposed upon heating to fluorine and non-reactive dissociation products, a tungsten filament having a portion which incandesces when an electric current flows therethrough and a portion which is at a lower temperature than the temperature of the incandescent portion, and a fluorine-resistant coating on said latter portion of said filament.

4. An incandescent lamp comprising a bulb having a gas filling consisting essentially of nitrogen hexafluoride at a partial pressure not exceeding 10 Torrs, a tungsten filament having a portion which incandesces when an electric current flows therethrough and a portion which is at a lower temperature than the temperature of the incandescent portion, and a fluorine-resistant coating on said latter portion of said filament.

5. An incandescent lamp comprising a bulb having a gas filling consisting essentially of tungsten hexafluoride at a partial pressure not exceeding 10 Torrs, a tungsten filament having a portion which incandesces when an electric current flows therethrough and a portion which is at a lower temperature than the temperature of the incandescent portion, a coating of nickel on said latter portion of said filament.

References Cited by the Examiner

UNITED STATES PATENTS

| | | | |
|---|---|---|---|
| 1,166,464 | 1/1916 | Liebmann | 313—222 |
| 1,655,488 | 1/1928 | Wolff | 313—223 |
| 1,695,600 | 12/1928 | Metcalf | 313—271 |
| 1,925,857 | 9/1933 | Liempt | 313—222 |
| 1,944,825 | 1/1934 | Millner | 313—223 |
| 2,179,437 | 11/1939 | Socolofsky | 313—223 |
| 2,222,093 | 11/1940 | Swanson | 313—271 |
| 2,883,571 | 4/1959 | Fridrich | 313—223 |

JOHN W. HUCKERT, *Primary Examiner.*

JAMES D. KALLAM, *Examiner.*